United States Patent
Vrame

(12) United States Patent (10) Patent No.: US 7,631,902 B2
Vrame (45) Date of Patent: Dec. 15, 2009

(54) TRANSITION COUPLING

(75) Inventor: Paul A. Vrame, Crystal Lake, IL (US)

(73) Assignee: S-P Products, Inc., Elk Grove Village, IL (US)

( * ) Notice: Subject to any disclaimer, the term of this patent is extended or adjusted under 35 U.S.C. 154(b) by 0 days.

(21) Appl. No.: 12/012,644

(22) Filed: Feb. 5, 2008

(65) Prior Publication Data

US 2008/0238091 A1 Oct. 2, 2008

Related U.S. Application Data

(60) Provisional application No. 60/899,580, filed on Feb. 5, 2007.

(51) Int. Cl.
    *F16L 11/118* (2006.01)
(52) U.S. Cl. .................... 285/150.1; 52/220.8
(58) Field of Classification Search .............. 285/149.1, 285/154.4, 150.1; 52/704, 707, 709, 698, 52/220.1, 220.8
    See application file for complete search history.

(56) References Cited

U.S. PATENT DOCUMENTS

| | | | | |
|---|---|---|---|---|
| 899,639 A * | 9/1908 | Vibber | .................... | 285/154.4 |
| 1,737,242 A * | 11/1929 | Hooley | .................... | 285/149.1 |
| 1,770,883 A * | 7/1930 | Gangle | .................... | 285/149.1 |
| 1,831,856 A * | 11/1931 | Fullman | .................... | 285/404 |
| 2,005,174 A * | 6/1935 | Williams | .................... | 285/383 |
| 2,052,394 A * | 8/1936 | Fullman | .................... | 285/154.4 |
| 2,122,792 A * | 7/1938 | Bondeson | .................... | 285/154.4 |
| 2,522,235 A * | 9/1950 | Moore | .................... | 285/154.4 |
| 2,540,999 A * | 2/1951 | Thomas, Jr. | .................... | 285/149.1 |
| 2,749,148 A * | 6/1956 | Schneiderman | .................... | 285/154.4 |
| 3,306,638 A * | 2/1967 | Rubin | .................... | 285/154.4 |
| 3,639,677 A * | 2/1972 | Bain | .................... | 174/84 S |
| 3,951,436 A * | 4/1976 | Hyde, Jr. | .................... | 285/148.27 |
| 4,091,523 A * | 5/1978 | Riecke | .................... | 29/525.11 |
| 4,995,647 A * | 2/1991 | Carey | .................... | 285/149.1 |
| 7,078,623 B1 * | 7/2006 | Sheehan | .................... | 174/665 |

* cited by examiner

*Primary Examiner*—David E Bochna
(74) *Attorney, Agent, or Firm*—Wood, Phillips, Katz, Clark & Mortimer

(57) ABSTRACT

A transition coupling for connecting at least a first and a second piece of electrical conduit is provided, such as for positioning in a concrete slab of a building or other structure. The coupling includes a first opening for receiving the first piece of electrical conduit, a second opening for receiving the second piece of electrical conduit, and a body extending between the first and second openings.

3 Claims, 1 Drawing Sheet

TRANSITION COUPLING

CROSS-REFERENCE TO RELATED APPLICATION

This application claims the benefit of priority Provisional Application No. 60/899,580, filed Feb. 5, 2007, the disclosure of which is incorporated herein by reference.

TECHNICAL FIELD

This invention pertains to couplings, and in more particular applications to electrical couplings, such as for electrical conduit extending from a floor or concrete slab.

BACKGROUND ART

Electrical conduit and related accessories may be made from a variety of materials such as thin wall metal, heavy wall metal, flexible tubing (MC cable and other types of flexible cable), PVC as well as other materials known to those skilled in the art. Often-times, these materials are used in combination and therefore, oftentimes couplings must be used to join the materials. Couplings are generally used to connect tubing, such as electrical conduit to various other forms of electrical tubing and support structures. In one form, electrical elbows are used to extend electrical conduit at least partially within a floor structure, such as a concrete slab.

In one form, electrical workers desire to have an electrical conduit opening located in a concrete slab and therefore, must place supporting structure in the location where the conduit is desired prior to the concrete slab being poured. Additionally, this structure must be protected to prevent poured concrete and other types of debris from entering the structure.

SUMMARY OF THE INVENTION

In one form, a transition coupling for connecting at least a first and a second piece of electrical conduit is provided. The coupling includes a first opening for receiving the first piece of electrical conduit, a second opening for receiving the second piece of electrical conduit, and a body extending between the first and second openings.

According to one form, the transition coupling further includes at least one indentation located within the body.

In one form, transition coupling further includes at least one securing member located on the body to secure the first piece of electrical conduit.

According to one form, the at least one securing member is a bolt extending at least partially through the body.

In one form, there are two securing members.

According to one form, an interior portion of the body is threaded adjacent the second opening. Optionally, an exterior portion of the body can be threaded, with suitable male threads, adjacent the second opening.

DETAILED DESCRIPTION OF THE PREFERRED EMBODIMENT

Figure 1:
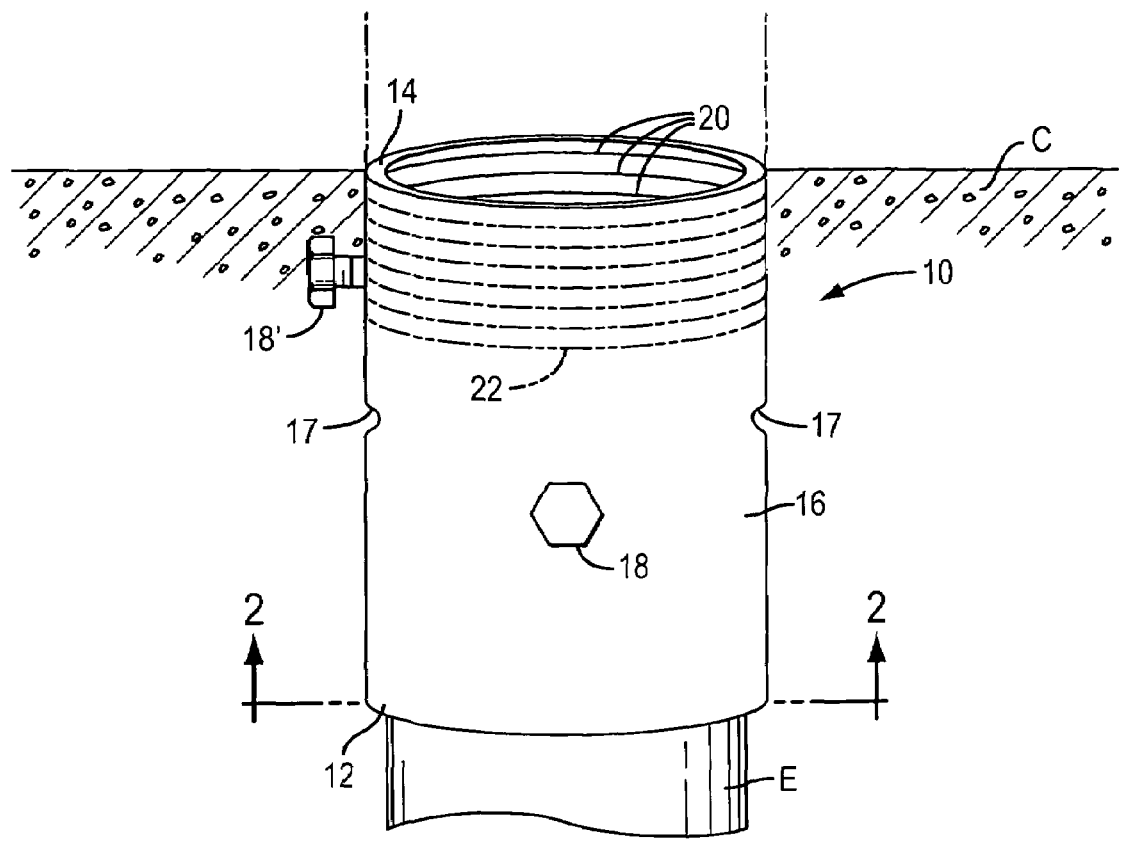
FIG. 1 is a side view of a transition coupling located in a concrete slab.
Figure 2:
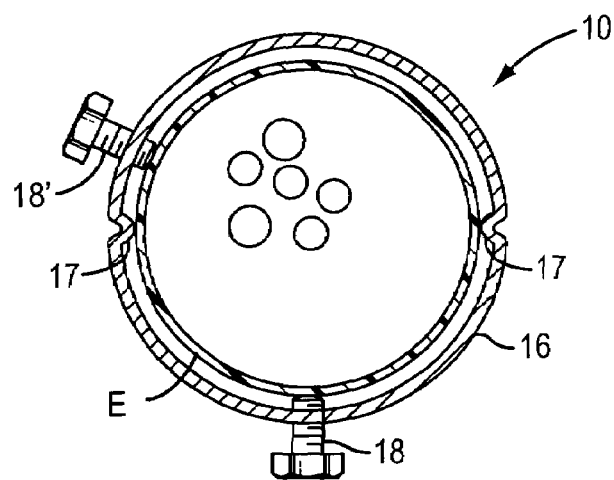
FIG. 2 is a view taken along line 2-2 of FIG. 1.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

Referring to FIG. 1, a transition coupling 10 is located in a concrete slab C, such as for the foundation of a building, the floors of multi-story building, and the like. As seen in the figures, the transition coupling 10 includes a first end 12, a second end 14, and a body 16 extending between the first and second ends. A first opening at first end 12 is suitable for receiving a first piece of electrical conduit while a second opening at second end 14 is suitable for receiving a second piece of electrical conduit.

In one embodiment, the transition coupling is installed over an elbow E, prior to pouring a concrete slab. The elbow can be inserted into the first end of the transition coupling. The installer can manipulate the transition coupling on the elbow such that the top of the transition coupling will be located at the surface of the poured concrete slab C.

In one embodiment, the transition coupling includes at least one protrusion 16 located within the body. As seen in the figures, the protrusion 17 extends into the interior of the body and can be used to abut the end of the first piece of conduit, and thus function as a stop element to facilitate positioning of the coupling. The at least one protrusion 17 can be located at a specific point along the body to permit the installer to calculate where the top of the transition coupling (in this case the second opening) will be located in relation to the surface of the concrete slab once it is poured.

In one embodiment, the transition coupling 10 includes a securing member. The securing member may be utilized to maintain the transition coupling relative 10 to the first piece of conduit (in one embodiment, the elbow E) prior to and during the pouring of the concrete slab. In one form, the securing member is a bolt 18 that may be adjusted to extend further into the body. The securing member 18 abuts the first piece of conduit such that the first piece of conduit is held between the securing member and the interior wall of the body of the transition coupling. In another embodiment, there are two securing members. These securing members may be located 180 degrees from one another. It should be understood to those skilled in the art that any number of securing members may be used and may be located in a variety of different locations with respect to one another.

In a further embodiment, the transition coupling includes at least one additional securing member 18' utilized to maintain the transition coupling relative to the second piece of conduit. In one form, the securing member is a bolt that may be adjusted to extend further into the body. The securing member abuts the second piece of conduit such that the second piece of conduit is held between the securing member and the interior wall of the body of the transition coupling. In another embodiment, there are two securing members. These securing members may be located 180 degrees from one another. It should be understood that the securing members to secure the first and second conduit pieces may be located such that they are aligned with one another and/or offset from one another vertically. It should be understood to those skilled in the art that any number of securing members may be used and may be located in a variety of different locations with respect to one another.

The transition coupling may also include a stopper. The stopper may be inserted into the second opening prior to pouring the concrete slab to prevent concrete or other debris from entering the transition coupling. In one form, the interior portion of the body 16 adjacent the second end 14 is threaded at female threads 20 to receive the stopper. Additionally, the exterior of the body 16 can optionally be provided with male threads 22, shown in phantom line, adjacent the second end 14, which can be provided to facilitate application of a ground bushing.

Furthermore, the interior portion of the body adjacent the second end can be threaded to secure the second piece of electrical conduit. The second piece of conduit may be installed before or after the concrete slab is poured. In one embodiment, the stopper is installed before the concrete slab is poured and then the second piece of conduit is installed after the concrete slab is poured.

The transition coupling may be made from a variety of materials such as metal, PVC and other materials known to those skilled in the art. In one embodiment, the transition coupling is made from metal and may be indented to create the protrusions inside the body. Furthermore, the body may be machined to permit insertion the securing member.

The transition coupling may be suitable for a variety of sized of conduit pieces. In one form, couplings may be suitable for ½"-4" ID conduit. However, it should be understood by those skilled in the art that other sizes of conduit are also contemplated.

The arrangement of the interior and/or exterior threads of the coupling can also be varied within the purview of the present invention. For example, it can be desirable to provide five threads, male or female, above the protrusions 18 of the coupling. Similarly, the exterior of the coupling can be smooth-surfaced for approximately two to two and one-half inches below the protrusions 17 to allow for vertical and lateral movement as a slip fitting.

Furthermore, the transition coupling may be suitable for used with a variety of types of electrical conduit and related components, which may be made from a variety of different materials. For example, the coupling may be suitable for use with an electrical elbow and an electrical conduit to extend from the concrete slab. These components may be made from a variety of materials such as thin wall steel, heavy wall steel, PVC and other materials known to those skilled in the art. Additionally, flexible electrical tubing may also be used with the transition coupling.

While the transition coupling has been described herein as extending to the surface of the concrete slab, the transition coupling may also be installed so as to extend beyond the surface of the concrete slab. Additionally, it should be understood that the transition coupling has been described herein in relation to a concrete slab, the transition coupling may also be used in a variety of other situations as understood by those skilled in the art.

The invention claimed is:

1. A transition coupling arrangement, comprising:
   a concrete slab;
   a first piece of electrical conduit positioned in the concrete slab;
   a second piece of electrical conduit; and
   a transition coupling comprising a unitary coupling body having a generally tubular configuration and a single wall, including a first end defining a first opening for receiving said first piece of electrical conduit, and a second end defining a second opening for receiving said second piece of electrical conduit, with said coupling body extending between said first and second openings, said coupling being disposed in said concrete slab with the second end thereof being accessible to facilitate connection of said second piece of electrical conduit thereto,
   said coupling including a coupling securing member extending though said coupling body for engagement with said first piece of electrical conduit received in said first opening,
   said coupling body defining at least one inwardly extending protrusion positioned in spaced relationship to said first and second ends of said coupling body, said protrusion being engageable by said first piece of electrical conduit received in said first opening to facilitate positioning of said coupling with respect to said first piece of electrical conduit,
   said coupling body further defining at least on thread formation on one of inner or outer surfaces of said coupling body at said second end thereof to facilitate connection of said second piece of electrical conduit to said coupling.

2. A transition coupling arrangement in accordance with claim 1, including
   a pair of said securing members, each extending through said coupling body for engagement with a respective on of said first and second pieces of electrical conduit.

3. A transition coupling arrangement in accordance with claim 1, wherein
   said coupling body defines a pair of said protrusions extending inwardly of said coupling body.

* * * * *